(12) United States Patent
D'Errico et al.

(10) Patent No.: US 10,414,973 B2
(45) Date of Patent: Sep. 17, 2019

(54) POLYMER INTERLAYERS COMPRISING STABILIZED FLUORESCENT PARTICLES

(71) Applicant: SOLUTIA INC., St. Louis, MO (US)

(72) Inventors: John J. D'Errico, Glastonbury, CT (US); Benjamin B. Thompson, Framingham, MA (US); Wenjie Chen, Amherst, MA (US)

(73) Assignee: Solutia Inc., St. Louis, MO (US)

( * ) Notice: Subject to any disclaimer, the term of this patent is extended or adjusted under 35 U.S.C. 154(b) by 820 days.

(21) Appl. No.: 14/465,803

(22) Filed: Aug. 21, 2014

(65) Prior Publication Data

US 2016/0115380 A1  Apr. 28, 2016

Related U.S. Application Data

(60) Provisional application No. 61/877,152, filed on Sep. 12, 2013.

(51) Int. Cl.
   *C09K 11/06* (2006.01)
   *B32B 17/10* (2006.01)
   (Continued)

(52) U.S. Cl.
   CPC ........ *C09K 11/06* (2013.01); *B32B 17/10669* (2013.01); *B32B 17/10761* (2013.01); *B32B 27/08* (2013.01); *B32B 27/20* (2013.01); *B32B 27/22* (2013.01); *B32B 27/30* (2013.01); *C08K 5/0041* (2013.01); *C08K 5/09* (2013.01);
   (Continued)

(58) Field of Classification Search
   CPC ........ C09K 11/06; C08K 5/0041; C08K 5/09; C08K 5/1345; C08L 29/14; B32B 17/10036; B32B 17/10669; B32B 17/10761; B32B 17/10678; B32B 17/1055; B32B 2307/4026; B32B 2605/006; B32B 27/08; B32B 27/20; B32B 27/22;
   (Continued)

(56) References Cited

U.S. PATENT DOCUMENTS

| 2,282,026 A | 5/1942 | Bren et al. |
| 2,282,057 A | 5/1942 | Hopkins et al. |

(Continued)

FOREIGN PATENT DOCUMENTS

| CN | 101 108 908 A | 1/2008 |
| CN | 101108908 A * | 1/2008 |

(Continued)

OTHER PUBLICATIONS

Machine translation of JP2000178045A, printed Jun. 9, 2016, 6 pages.*

(Continued)

*Primary Examiner* — Matthew E. Hoban
*Assistant Examiner* — Lynne Edmondson
(74) *Attorney, Agent, or Firm* — Michelle Bugbee

(57) ABSTRACT

An interlayer comprised of a thermoplastic resin, at least one luminescent pigment and a carboxylic acid additive. The use of a thermoplastic resin, at least one luminescent pigment and a carboxylic acid additive reduces or minimizes the optical defects (such as high color or yellowness and increased haze) caused by discoloration of the pigment without sacrificing other characteristics of the interlayer.

20 Claims, 4 Drawing Sheets

(51) Int. Cl.
*B32B 27/20* (2006.01)
*B32B 27/22* (2006.01)
*C08K 5/09* (2006.01)
*C08K 5/134* (2006.01)
*B32B 27/30* (2006.01)
*C08K 5/00* (2006.01)
*B32B 27/08* (2006.01)

(52) U.S. Cl.
CPC .... *C08K 5/1345* (2013.01); *B32B 2307/4026* (2013.01); *B32B 2307/418* (2013.01); *B32B 2605/006* (2013.01)

(58) Field of Classification Search
CPC ............ G02B 5/223; G02B 2027/0118; G02B 27/01; B29C 47/065; C09B 5/62
USPC .................... 252/301.35; 264/173.11, 173.16
See application file for complete search history.

(56) References Cited

U.S. PATENT DOCUMENTS

| | | | | |
|---|---|---|---|---|
| 5,013,780 | A * | 5/1991 | Fariss | C08K 5/11 428/437 |
| 5,137,954 | A | 8/1992 | DasGupta et al. | |
| 5,728,472 | A | 3/1998 | D'Errico | |
| 7,510,771 | B2 | 3/2009 | Lu | |
| 8,487,277 | B2 | 7/2013 | Labrot | |
| 2011/0076473 | A1* | 3/2011 | Lin | B32B 17/10 428/213 |
| 2012/0068083 | A1* | 3/2012 | Labrot | B32B 17/10 250/461.1 |
| 2013/0252001 | A1 | 9/2013 | Sablayrolles et al. | |
| 2015/0246508 | A1 | 9/2015 | Oota et al. | |
| 2015/0251385 | A1 | 9/2015 | Oota et al. | |
| 2015/0258752 | A1 | 9/2015 | Oota et al. | |

FOREIGN PATENT DOCUMENTS

| | | |
|---|---|---|
| CN | 102 174 238 A | 9/2011 |
| EP | 2110237 A1 | 10/2009 |
| JP | H08119687 | 5/1996 |
| JP | H11106595 | 4/1999 |
| JP | 2000 178 045 A | 6/2000 |
| JP | 2000178045 A * | 6/2000 |
| JP | 2012 066 954 A1 | 4/2012 |
| JP | 2012066954 A * | 4/2012 |

OTHER PUBLICATIONS

Honor Chemicals website (http://pigmentseller.com/5-2-ob-fluorescent-brightener.html), OB fluorescent brightener, printed Jun. 9, 2016 , 2 pages.*
Chemical book website (http://www.chemicalbook.com/ChemicalProductProperty_EN_CB4481858.htm), Dinonyl phthalate, printed Jun. 9, 2016, 3 pages.*
Flexol plasticizer 3go, ChmBK CAS Database, (http://www.chembk.com/en/chem/Flexol%20plasticizer%203go), printed Jun. 8, 2016, 2 pages.*
Wikipedia citation for 2-ethylhexanoic acid, (https://en.wikipedia.org/wiki/2-Ethylhexanoic_acid), printed Jun. 9, 2016, 3 pages.*
Wikipedia citation for cyanine, (https://en.wikipedia.org/wiki/Cyanine), printed Jun. 9, 2016, 6 pages.*
Wikipedia citation for acid dissociation constant, (https://en.wikipedia.org/wiki/Acid_dissociation_constant), printed Jun. 9, 2016, 22 pages.*
Sigma-Aldrich website (http://www.sigmaaldrich.com/catalog/product/aldrich/460214?lang=en&region=US), Diisodecyl adipate, printed Jun. 10, 2016, 3 pages.*
Chemical Abstract Services No. 2011:1147033.
Chemical Abstract Services No. 2008:111251.
Chemical Abstract Services No. 2012:500381.
Chemical Abstract Services No. 2000:427891.
Wade, B.E., Vinyl Acetal Polymers, in Encyclopedia of Polymer Science & Technology, 3rd edition, vol. 8, pp. 381-399, (2003).
PCT International Search Report and Written Opinion dated Dec. 12, 2014 for International Application No. PCT/US2014/054664.
Notification of Transmittal of the International Search Report and the Written Opinion of the International Searching Authority, or the Declaration dated Feb. 16, 2017 received in International Application No. PCT/US2016/063824.
Co-pending U.S. Appl. No. 14/972,347 filed Dec. 17, 2015; Thompson and D'Errico.

* cited by examiner

POLYMER INTERLAYERS COMPRISING STABILIZED FLUORESCENT PARTICLES

CROSS REFERENCE TO RELATED APPLICATIONS

This application claims the benefit of U.S. Provisional Patent Application Ser. No. 61/877,152, filed Sep. 12, 2013, the entire disclosure of which is incorporated by reference herein.

BACKGROUND OF THE INVENTION

1. Field of the Invention

This disclosure is related to the field of polymer interlayers for multiple layer panels and multiple layer panels having at least one polymer interlayer sheet. Specifically, this disclosure is related to the field of stabilized fluorescent particles for use in polymer interlayers and polymer interlayers comprising stabilized fluorescent particles.

2. Description of Related Art

Multiple layer panels are generally panels comprised of two sheets of a substrate (such as, but not limited to, glass, polyester, polyacrylate, or polycarbonate) with one or more polymer interlayers sandwiched therebetween. The laminated multiple layer glass panels are commonly utilized in architectural window applications and in the windows of motor vehicles and airplanes. These applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer may, among other things, give the glass a much higher sound insulation rating, reduce UV and/or IR light transmission, and/or enhance the aesthetic appeal of the associated window. The interlayer may be a single layer, a combination of two or more single layers, a multilayer that has been coextruded, a combination of at least one single layer and at least one multilayer, or a combination of multilayer sheets. In regard to the photovoltaic applications, the main function of the interlayer is to encapsulate the photovoltaic solar panels which are used to generate and supply electricity in commercial and residential applications.

Laminated safety glass, or multiple layer glass panels, is used in many different applications in the transportation industry, including automotive, railroad, and aviation vehicles. Polymer interlayers used in laminated safety glass have also been used as an important component in transportation vehicles, such as in automobile head-up display (HUD) systems, which can provide, for example, an instrument cluster image at the eye level of a driver of the vehicle, such as an automobile, or in the cockpit of an airplane. Such a display allows a driver to stay focused on the road in front of him while visually accessing important dash board information. One type of interlayer used in such head-up display systems is an interlayer that is wedge shaped in vertical cross section. The wedge shape of the interlayer is used to provide the correct light dynamics through the windshield required for a head-up display. While the wedge shaped interlayer is effective to provide the correct light dynamics, the wedge shaped interlayer is sometimes difficult to handle during processing due to the different thicknesses across the cross section. When wound onto a core, one side of the roll (where the thickness is greatest) is larger than the other side, or when cut windshield blanks are stacked, one side of the stack is thicker or higher than the other side due to the thicker wedge section.

Head-up displays have also been widely used in aviation applications. The systems mounted in the direct field of vision of pilots display the most important data about their own and other aircraft. These systems, established and much used in the military sector, also have many possibilities for use in the civil sector, in particular in the automobile sector. Thus, data about the speed, the distance from the preceding vehicle or directional data from the navigation equipment can be displayed right at the eye level of the driver. These possibilities clearly improve the traffic safety of the vehicle as the driver cannot watch the traffic situation while looking at the instruments. With increased speeds of the motor vehicle, on freeways, for example, the distance traveled "blind" by the vehicle can be significant and can cause an increased accident rate. There is a need for improved interlayers for use in windshields having head-up displays.

Interlayers for windshields and other multiple layer glass panel applications are generally produced by mixing a polymer resin (or resins) such as poly(vinyl butyral) with one or more plasticizers and other additives and melt processing the mix into a sheet by any applicable process or method known to one of skill in the art, including, but not limited to, extrusion. For multiple layer interlayers comprising two or more layers, the layers may be combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

Contemplated polymer interlayers include, but are not limited to, poly(vinyl)acetal resins such as poly(vinyl butyral) (PVB), polyurethane (PU), poly(ethylene-co-vinyl acetate) (EVA), polyvinylchloride (PVC), polyethylenes, polyolefins, ethylene acrylate ester copolymers, poly(ethylene-co-butyl acrylate), silicone elastomers, epoxy resins and any acid copolymers and ionomers derived from any of the foregoing possible thermoplastic resins. Multilayer laminates can include multiple layer glass panels and multilayer polymer films. In certain embodiments, the multiple polymer films in the multilayer laminates may be laminated together to provide a multilayer film or interlayer. In certain embodiments, these polymer films may have coatings, such as metal, silicone or other applicable coatings known to those of ordinary skill in the art. The individual polymer films which comprise the multilayer polymer films may be laminated together using an adhesive as known to those of ordinary skill in the art.

The following offers a simplified general description of the manner in which multiple layer glass panels are generally produced in combination with the interlayers. First, at least one polymer interlayer sheet (single or multilayer) is placed between two substrates and any excess interlayer is trimmed from the edges, creating an assembly. It is not uncommon for multiple polymer interlayer sheets or a polymer interlayer sheet with multiple layers (or a combination of both) to be placed within the two substrates creating a multiple layer glass panel with multiple polymer interlayers. Then, air is removed from the assembly by an applicable process or method known to one of skill in the art; e.g., through nip rollers, vacuum bag or another deairing mechanism. Additionally, the interlayer is partially press-bonded to the substrates by any method known to one of ordinary skill in the art. In a last step, in order to form a final unitary structure, this preliminary bonding is rendered more permanent by, for example, a high temperature and pressure lamination process known to one of ordinary skill in the art such as, but not limited to, autoclaving, or by other processes known to one of ordinary skill in the art.

One of the problems in the manufacture of multilayer laminate glass panels is the presence of various optical defects in the final unitary structure or laminate, such as the windshield or panel. The multiple layer glass panels need to be free of optical defects and have good clarity (or low haze values) to allow for clear vision through the glass panels. Additionally, the multiple layer glass panels need to be aesthetically pleasing, that is, the glass panels cannot have a high level of undesirable color, such as yellow color. It is important to maintain the high optical clarity standards when adding new features and functionality to the glass panels.

Optical quality defects such as haze or lack of clarity and increased color or yellowness are common problems in the field of multiple layer glass panels. Good optical quality is particularly important where the multiple layer glass panels are those used in applications which require higher levels of optical or visual quality, such as windshields. This is even more important for windshields or other multiple layer glass panels where head-up displays or other features are used. In an attempt to improve the multiple layer glass panels used in windshields and other glazing applications, and particularly those used with head-up displays, new technology has been developed to provide improved head-up displays. One attempt to improve the technology is the use of fluorescent or luminescent pigments in the windshield. Using a fluorescent or luminescent pigment based head-up display has potential advantages over head-up displays that use wedge shaped interlayers, such as easier and more efficient polymer interlayer production, handling and storage, as well as improved lamination capabilities. However, the use of the fluorescent pigments results in other unfavorable sacrifices, including, but not limited to, uneven distribution of the pigments on and/or in the interlayer, poor optical quality (i.e., increased color and haze in the laminate), visual defects, poor (too high or too low) adhesion, increased manufacturing costs (i.e., the costs associated with producing the multilayer interlayer as well as the cost of the pigment). Accordingly, there is a need in the art for the development of an interlayer that can be used in head-up display applications and has excellent optical and other properties, such as an interlayer that resists or prevents the formation of color or yellowness and an increase in haze (or reduction in clarity) without a reduction in other optical, mechanical, and performance characteristics of a conventional interlayer.

SUMMARY OF THE INVENTION

Because of these and other problems in the art, described herein, among other things is a polymer interlayer that fluoresces and has a yellowness index ("YI") value that is less than about 12. In an embodiment, a polymer interlayer for glazing, comprising: poly(vinyl butyral), a plasticizer, a luminescent pigment, and a carboxylic acid additive having a $pK_a$ of less than about 10, wherein the polymer interlayer has a YI of less than 12 (as measured by ASTM D1003-95 or its equivalent), and wherein the polymer interlayer fluoresces at a wavelength of about 400 to 700 nm is disclosed. In some embodiments, the carboxylic acid additive has a structural formula: R—CO$_2$H, where R is hydrogen, an alkyl group or an aryl group. In embodiments, the plasticizer comprises at least one high refractive index plasticizer having a refractive index of at least about 1.460.

In another embodiment, a polymer interlayer for glazing, comprising: poly(vinyl butyral), a plasticizer, from about 0.1 to about 1 phr of a luminescent pigment, and a carboxylic acid additive having a $pK_a$ of less than about 10, wherein the polymer interlayer has a YI of less than 12, and wherein the polymer interlayer fluoresces at a wavelength of about 400 to 700 nm is disclosed. In embodiments, the plasticizer comprises at least one high refractive index plasticizer having a refractive index of at least about 1.460.

In another embodiment, a polymer interlayer for glazing, comprising: poly(vinyl butyral), a plasticizer, from about 0.1 to about 1 phr of a luminescent pigment, wherein the luminescent pigment is a pigment having the structural formula: R—OOC—Ar(OH)$_x$—COO—R, wherein each R is independently a substituent group having at least 1 carbon atom and may be the same or different, Ar is an aryl group, and x is from about 1 to 4, and a carboxylic acid additive having a $pK_a$ of less than about 10, wherein the polymer interlayer has a YI of less than 12, and wherein the polymer interlayer fluoresces at a wavelength of about 400 to 700 nm is disclosed. In embodiments, the plasticizer comprises at least one high refractive index plasticizer having a refractive index of at least about 1.460.

A multiple layer panel is also disclosed. The multiple layer panel comprises at least one rigid substrate, and a polymer interlayer or multiple layer polymer interlayer as disclosed herein. The panel has improved optical properties.

A method of making a polymer interlayer is also disclosed, wherein the multilayer interlayer comprises a poly(vinyl butyral), a plasticizer, a luminescent pigment, and a carboxylic acid additive having a $pK_a$ of less than about 10, wherein the polymer interlayer has a YI of less than 12 (as measured by ASTM D1003-95 or its equivalent), and wherein the polymer interlayer fluoresces at a wavelength of about 400 to 700 nm, as disclosed herein. The polymer interlayer may be a multiple layer polymer interlayer.

In certain embodiments, the rigid substrate (or substrates) is glass. In other embodiments, the panel may further comprise a photovoltaic cell, with the interlayer encapsulating the photovoltaic cell.

DESCRIPTION OF THE PREFERRED EMBODIMENT(S)

Figure 1:
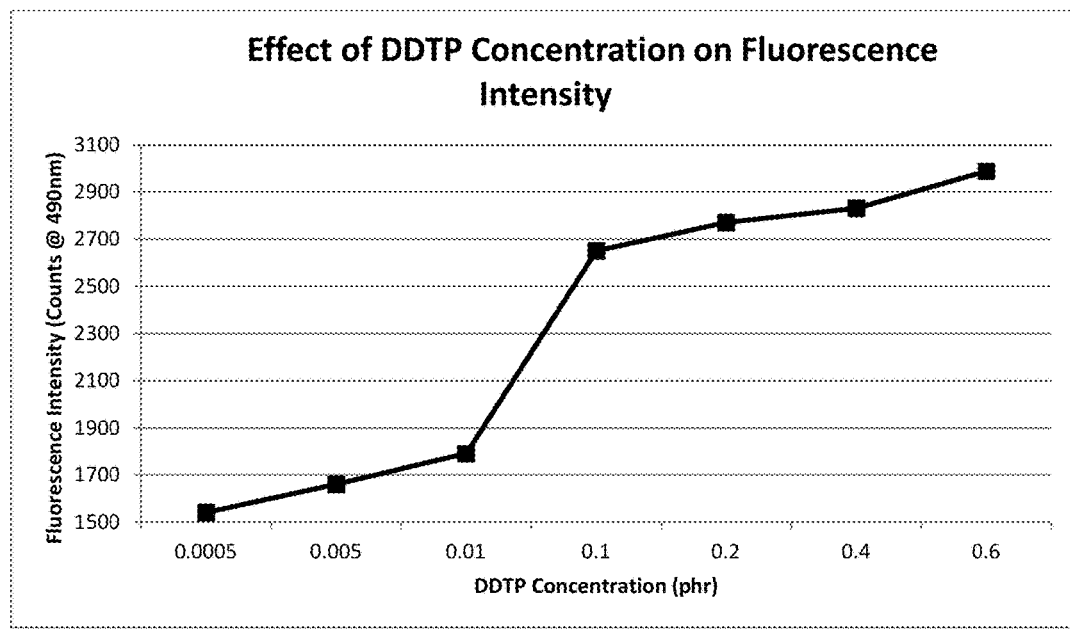
FIG. 1 is a graph showing the effect of fluorescent pigment concentration on fluorescence intensity.

The use of a thermoplastic resin, at least one fluorescent or luminescent pigment and a carboxylic acid additive, when melt-extruded, creates an interlayer having decreased color or lower yellowness index (less discoloration) and decreased or less haze compared to conventional interlayers with fluorescent pigments without the carboxylic acid additive, without sacrificing other physical and optical characteristics. In this regard, the combination of the fluorescent pigment, when selected to have the desired absorption and emission ranges, and the additive, when selected within a $pK_a$ range of about 2 to 12, or about 2 to 10, or about 3 to 8, or about 3 to 5, or at least 2, or at least 3, or 12 or less, or 11 or less, or 10 or less, or 9 or less, or 8 or less, or 7 or less, or 6 or less, or 5 or less, results in an interlayer having excellent optical properties as measured by color or yellowness, or the change in yellowness index.

Another measure of optical quality is the amount (or percent) of haze, which is a measurement of the amount of light diffusely scattered by a nearly clear specimen, as measured by, for example, a HunterLab UltraScan XE. The HunterLab UltraScan XE uses a procedure that is equivalent to the ASTM D1003-95 measurement procedure. The interlayers of the present invention have good optical quality without sacrificing other performance or mechanical properties, and they provide other benefits such as improved efficiency of manufacture and easier storage and transport than, for example, wedge polymer interlayers.

Described herein, among other things, are interlayers comprised of a thermoplastic resin, at least one fluorescent or luminescent pigment, and a carboxylic acid additive, wherein the interlayer has good optical properties and minimal change or reduction in other properties such that the other properties are acceptable. In an embodiment, a polymer interlayer for glazing, comprises: poly(vinyl butyral), a plasticizer, a luminescent pigment, and a carboxylic acid additive having a $pK_a$ of less than about 10, wherein the polymer interlayer has a YI of less than 12, and wherein the polymer interlayer fluoresces at a wavelength of about 400 to 700 nm. In some embodiments, the polymer interlayer has a YI of less than 10, or less than 9. In some embodiments, the carboxylic acid additive has a structural formula: $R—CO_2H$, where R is hydrogen, an alkyl group or an aryl group. In embodiments, the luminescent pigment is a pigment having the structural formula: $R—OOC—Ar(OH)_x—COO—R$, wherein each R is independently a substituent group having at least 1 carbon atom and may be the same or different, Ar is an aryl group, and x is from about 1 to 4. In some embodiments, R is a substituent group having up to 10 carbon atoms, and x is 1 or 2. In an embodiment, the luminescent pigment has a structural formula:

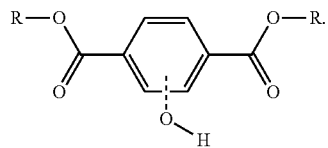

wherein each R is an ethyl group. In embodiments, the luminescent pigment comprises diethyl 2,5-dihydroxyterephthalate ("DDTP") having a structural formula:

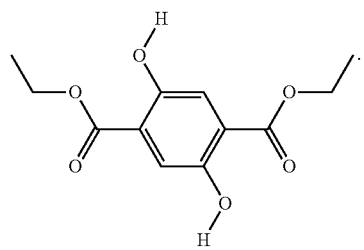

In embodiments, the carboxylic acid additive has a $pK_a$ of from about 3 to about 8. In an embodiment, the carboxylic acid additive is 2-ethylhexanoic acid. In embodiments, the polymer interlayer has a YI that is less than a polymer interlayer having the same composition without the carboxylic acid additive having a $pK_a$ of less than about 10.

In another embodiment, a polymer interlayer for glazing, comprises: poly(vinyl butyral), a plasticizer, from about 0.1 to about 1 phr of a luminescent pigment, and a carboxylic acid additive having a $pK_a$ of less than about 10, wherein the polymer interlayer has a YI of less than 12, and wherein the polymer interlayer fluoresces at a wavelength of about 400 to 700 nm. In some embodiments, the polymer interlayer has a YI of less than 10, or less than 9. In an embodiment, the carboxylic acid additive is present in an amount of at least about 5 wt. % of the luminescent pigment. In an embodiment, the polymer interlayer has a YI that is less than a polymer interlayer having the same composition without the carboxylic acid additive having a $pK_a$ of less than about 10. In an embodiment, the carboxylic acid additive has a structural formula: $R—CO_2H$, where R is hydrogen, an alkyl group or an aryl group. In an embodiment, the luminescent pigment is a pigment having the structural formula: $R—OOC—Ar(OH)_x—COO—R$, wherein each R is independently a substituent group having at least 1 carbon atom and may be the same or different, Ar is an aryl group, and x is from about 1 to 4. In some embodiments, R is a substituent group having up to 10 carbon atoms, and x is 1 or 2. In an embodiment, the luminescent pigment has a structural formula:

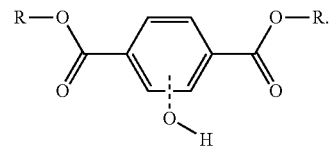

wherein each R is an ethyl group. In an embodiment, the luminescent pigment comprises diethyl 2,5-dihydroxyterephthalate ("DDTP") having a structural formula:

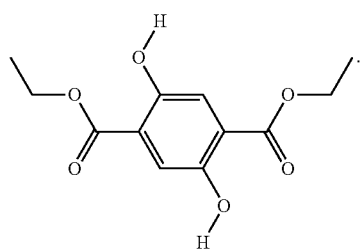 [SMILES: CCOC(=O)c1cc(O)c(C(=O)OCC)cc1O]

In an embodiment, the carboxylic acid additive has a $pK_a$ of from about 3 to about 8. In an embodiment, the carboxylic acid additive is 2-ethylhexanoic acid.

In another embodiment, a polymer interlayer for glazing, comprises: poly(vinyl butyral), a plasticizer, from about 0.1 to about 1 phr of a luminescent pigment, wherein the luminescent pigment is a pigment having the structural formula: $R—OOC—Ar(OH)_x—COO—R$, wherein each R is independently a substituent group having at least 1 carbon atom and may be the same or different, Ar is an aryl group, and x is from about 1 to 4, and a carboxylic acid additive having a $pK_a$ of less than about 10, wherein the polymer interlayer has a YI of less than 12, and wherein the polymer interlayer fluoresces at a wavelength of about 400 to 700 nm. In some embodiments, the polymer interlayer has a YI of less than 10, or less than 9.

In an embodiment, the polymer interlayer is laminated between two rigid substrates to form a window or windshield. In an embodiment, the polymer interlayer has a YI that is less than a polymer interlayer having the same composition without the carboxylic acid additive having a $pK_a$ of less than about 10. In some embodiments, R is a substituent group having up to 10 carbon atoms, and x is 1 or 2.

Polymer interlayers often comprise many different additives for many different functions. For example, colorants such as dyes or pigments may be added to change the color of all or part of the interlayer. Adhesion control agents may be added to help control the level of adhesion that the polymer interlayer has to glass or other substrates. Other additives, such as anti-blocking agents, infrared ("IR") absorbing agents, ultraviolet ("UV") absorbing agents, as well as many other additives known to one skilled in the art, may be included. Fluorescent or luminescent pigments may be added to a polymer interlayer to provide special properties under certain lighting conditions, such as to provide a head-up display. The fluorescent or luminescent pigments (as well as any other additives) may be added to one or more layers of the polymer interlayer.

Previous attempts to add fluorescent pigments to interlayers have been made by various coating or spraying methods, such as coating or spraying a solution of the fluorescent pigment in a solvent onto the interlayer sheet. In an attempt to provide a more uniform distribution of the fluorescent pigments in the interlayers, the fluorescent pigments were added to the raw materials prior to extrusion of the polymer interlayer to allow for more uniform mixing and distribution of the fluorescent pigments throughout the entire polymer interlayer. The fluorescent pigments may be added, for example, to the plasticizer (along with other additives, as desired), and the plasticizer and additives are mixed, and this mixture of plasticizer and additives (as desired) is then mixed with the resin and extruded. Once extruded, it was noted that the pigments caused increased color or yellowing of the interlayer, as further described below.

As used herein, the term "fluorescent" refers to the emission of light by the dye or pigment, after absorbing light radiation, at a defined wavelength (due to the Stokes shift). As used herein, the terms "fluorescent" and "luminescent" may be used interchangeably throughout this description. By comparison, a non-fluorescent or non-luminescent dye or pigment does not absorb the energy and re-emit it at a defined wavelength, but instead absorbs it as heat (i.e. a broad band of radiation).

Any suitable fluorescent pigment or dye can be used as long as it does not significantly adversely affect the desired properties of the interlayer or the desired application, such as interfering with other components in the polymer interlayer, such as interfering with UV absorbers, increasing or decreasing adhesion levels, causing discoloration, and the like. The terms "dye" and "pigment" may be used interchangeably when referring to the luminescent or fluorescent material. Examples of suitable pigments and dyes include, but are not limited to, organic and/or inorganic chromophoric or luminescent compounds. Luminescence includes fluorescence and/or phosphorescence processes (i.e., excitation with electromagnetic radiation and the emission of electromagnetic radiation). In embodiments, the radiation emitted has a different wavelength from the excitation radiation, and in some embodiments the radiation emitted has a higher wavelength than the excitation radiation.

As used herein, the "short ultraviolet spectrum" means wavelengths in the region of 200 nm to 300 nm, the "long ultraviolet spectrum" means wavelengths greater than 300 nm to about 400 nm, and the "visible spectrum" means wavelengths in the region of about 400 to about 700 nm, and the "near infra-red spectrum" means wavelengths greater than about 700 nm up to about 3000 nm. The luminescent component may also be selected to be capable of multiple luminescent responses, such as in the visible spectrum and near infra-red spectrum, if desired.

In embodiments, the luminescent pigment has a local excitation maximum in the range from 350 nm to 450 nm, or from 390 nm to 420 nm, and a local emission maximum in the range from 400 nm to 800 nm, or from 430 nm to 600 nm.

Typically, the luminescent effect may be a fluorescent effect observable only during the time when the excitation source (such as a lamp or other device) is present or within a short time, such as less than a second, thereafter. Alternately, in some applications, a phosphorescent effect observable for a short time after the activating light energy is terminated may be desired. Such effect observable after the activating light energy is terminated is often referred to as "afterglow". Such periods of afterglow can be from greater than about 10 minutes and up to about 200 minutes or longer, for example, from about 15 minutes to about 120 minutes, or from about 15 minutes to about 60 minutes.

The luminescent pigment must be compatible with poly (vinyl butyral), plasticizer and other additives used in interlayers. In some embodiments, the luminescent pigment must be able to be used and extruded with poly(vinyl butyral).

In an embodiment, the luminescent pigment may contain a hydroxyalkyl terephthalate, such as a hydroxyalkyl terephthalate having the formula: R—OOC—Ar(OH)$_x$—COO—R, wherein each R is independently a substituent group having at least 1 carbon atom and may be the same or different, Ar is an aryl group, such as a phenyl ring, and x is from about 1 to 4. In some embodiments, R is a substituent group having up to 10 carbon atoms, and x is 1 or 2.

Suitable substituent groups have at least one carbon atom. Examples include, but are not limited to, alkyl, allyl, and aryl groups, or a substituted allyl, alkyl, or aryl group having a substitution such as a chlorine, fluorine, or any other substituent as desired.

In an embodiment, the general structural formula of the hydroxyalkyl terephthalate may be:

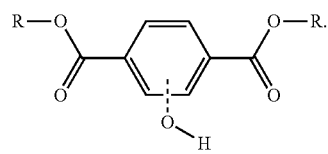

wherein the R groups are as previously defined. In an embodiment, the luminescent pigment comprises diethyl 2,5-dihydroxyterephthalate ("DDTP") having a structural formula:

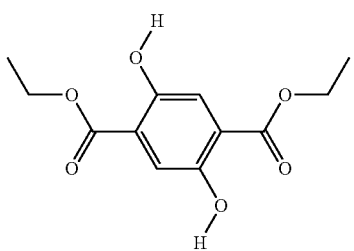

wherein each R is an ethyl group. Pigments having other substitutions for R may also be used.

The luminescent pigment may also comprise a second pigment, such as one of the following pigments: benzopyranes, naphthopyranes, 2H-naphthopyranes, 3H-naphthopyranes, 2H-phenanthropyranes, 3H-phenanthropyranes, photochromic resins, coumarins, xanthines, naphthalic acid derivatives, oxazoles, stilbenes, styryls, perylenes, lanthanides, and/or mixtures thereof.

In embodiments, the luminescent pigment is present in the polymer interlayer in an amount of from about, 0.1 to about 1 pounds per hundred pounds resin (phr), or 0.2 to about 0.6 phr, or at least about 0.1 phr, or at least about 0.2 phr, or less than 2 phr. Other amounts may be used as desired, depending on the application. In embodiments where optical clarity is desired, the luminescent pigment, when included in the interlayer, should not be visible under normal light conditions. Stated a different way, the luminescent pigment should not adversely affect the transparency or visible light transmission of the interlayer, or the multiple layer glass panel, under normal daylight conditions.

The inventors have found that when the luminescent pigment is mixed with the other raw materials and then extruded at normal extrusion temperatures, the resulting polymer interlayer has a higher color or yellowness index and higher haze level than a polymer interlayer without the luminescent pigment. To reduce or prevent the discoloration or the high yellowness index, the inventors have found that addition of a small amount of an additive such as a carboxylic acid additive into the composition reduces the discoloration of the luminescent pigment and resulting higher YI and produces a polymer interlayer having good optical quality, including acceptable color and haze levels.

The carboxylic acid additive may be any suitable carboxylic acid known to one skilled in the art that is compatible with the poly(vinyl butyral) and other additives. In some embodiments, carboxylic acids having a $pK_a$ of greater than about 3 are particularly useful as carboxylic acids with a $pK_a$ of less than 3 may lead to degradation of the polymer. In some embodiments, carboxylic acids having a $pK_a$ of about 10 or less are particularly suitable since acids having higher $pK_a$ values, such as greater than about 10, did not reduce undesirable yellowness, and in some cases, the yellowness actually increased. In some embodiments, the carboxylic acids have a $pK_a$ of from about 3 to about 10, or from about 3 to about 8.

Suitable carboxylic acids are any acids having at least one carboxyl functional group (or carboxy group), which has the formula —C(=O)OH, usually written as —COOH or —CO$_2$H. The carboxylic acid may be one having the structure R—COOH or R—CO$_2$H, where R is hydrogen, any alkyl or aryl group, or other common substituents known in the art. In an embodiment, R may be CH$_3$(CH$_2$)$_3$CH(C$_2$H$_5$). Carboxylic acids are one of the most common types of organic acid. Examples of carboxylic acids include, but are not limited to, formic acid (H—COOH), acetic acid (CH$_3$—COOH), mellitic acid, benzoic acid, oxalic acid, salicylic acid, 2-ethylhexanoic acid (CH$_3$(CH$_2$)$_3$CH(C$_2$H$_5$)CO$_2$H), adipic acid, maleic acid, propionic acid, tartaric acid, succinic acid, and many others known to one skilled in the art. Any carboxylic acid can be used, depending on the compatibility with other materials, and in some embodiments, a carboxylic acid having a $pK_a$ of from about 3 to about 10, or a $pK_a$ of from about 3 to 8, or from about 3 to 5, or at least 3, or at least 4, or less than or equal to 10, or less than 9, or less than 8 is used.

The amount of carboxylic acid used is chosen such that the amount is effective to decrease or prevent yellowing (to prevent increased yellowness compared to a composition without the acid additive) and haze formation in the interlayer. In embodiments, the amount of carboxylic acid used may be in the range of from about 5 to about 300 wt. % of the amount of luminescent pigment, or about 10 to about 200 wt. %, or about 15 to about 50 wt. % of the amount of luminescent pigment, or at least 5 wt. %, or at least 10 wt. %, or at least 15 wt. %, or less than or equal to 300 wt. %, or less than or equal to 200 wt. %, or less than or equal to 100 wt. % of the luminescent pigment. In an embodiment, the amount of carboxylic acid used is about half (i.e., 50 wt. %) of the amount of luminescent pigment used, although one skilled in the art can determine the most effective amount depending on the additives, the application and the properties desired.

Some terminology used throughout this application will be explained to provide a better understanding of the invention. The terms "polymer interlayer sheet," "interlayer," and "polymer melt sheet" as used herein, generally may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present disclosure, a multilayered interlayer comprises at least two polymer layers (e.g., a single layer or multiple layers co-extruded) disposed in direct contact with each other, wherein each layer comprises a polymer resin, as detailed more fully below.

As used herein, "skin layer" generally refers to an outer layer of the interlayer and "core layer" generally refers to an inner layer(s). Thus, one exemplary embodiment would be: skin layer/core layer/skin layer. It should be noted, however, further embodiments include interlayers having only two layers or more than three layers (e.g., 4, 5, 6, or up to 10 individual layers). Additionally, any multilayer interlayer utilized can be varied by manipulating the composition, thickness, or positioning of the layers and the like. For example, in one trilayer polymer interlayer sheet, the two outer or skin layers may comprise poly(vinyl butyral) ("PVB") resin with a plasticizer or mixture of plasticizers, while the inner or core layer may comprise the same or different PVB resin or different thermoplastic material with a plasticizer and/or mixture of plasticizers. Thus, it is contemplated that in an embodiment having skin/core/skin layers, the skin layers and the core layer(s) of the multilayered interlayer sheets may be comprised of the same thermoplastic material or different thermoplastic materials. Any of the layers may include additional additives as known in the art, as desired.

As used herein, "stiff layer" or "stiffer layer" generally refers to a layer that is stiffer or more rigid than another layer and that has a glass transition temperature that is generally at least two degrees C. (2° C.) higher than another layer. As used herein, the "soft layer" or "softer layer" generally refers to a layer that is softer than another layer and that has a glass transition temperature that is generally at least two degrees C. (2° C.) lower than another layer. In the multilayer interlayers having skin layer/core layer/skin layer configuration, in some embodiments the skin layer maybe stiffer and the core layer may be softer, while in other embodiments the skin layer may be softer and the core layer may be stiffer.

Although the embodiments described below refer to the polymer resin as being PVB, it would be understood by one of ordinary skill in the art that the polymer may be any polymer suitable for use in a multiple layer panel. Typical polymers include, but are not limited to, PVB, polyurethane, polyvinyl chloride, poly(ethylene-co-vinyl acetate), combinations of the foregoing, and the like. PVB, poly(ethylene-co-vinyl acetate), and polyurethane are useful polymers generally for interlayers; PVB is particularly suitable when used in conjunction with the interlayers of this disclosure comprising fluorescent or luminescent pigments for use in windshields having head-up displays.

Prior to discussing the addition of the luminescent pigment and carboxylic acid selected to produce the interlayer having improved optical quality and reduced yellowness, some common components found in an interlayer, both generally and in interlayers of the present disclosure, and the formation thereof will be discussed.

The PVB resin is produced by known acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc., a subsidiary of Eastman Chemical Company.

As used herein, residual hydroxyl content (calculated as PVOH) refers to the amount of hydroxyl groups remaining on the polymer chains after processing is complete. For example, PVB can be manufactured by hydrolyzing poly (vinyl acetate) to PVOH, and then reacting the PVOH with butyraldehyde. In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral) resin, there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the poly(vinyl butyral) resin comprises about 8 to about 35 weight percent (wt. %) hydroxyl groups calculated as PVOH, or about 13 to about 30 wt. %, about 9 to about 22 wt. %, or about 15 to about 22 wt. %; or for certain embodiments, about 17.75 to about 19.85 wt. % hydroxyl groups calculated as PVOH. The resin can also comprise less than 15 wt. % residual ester groups, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as a 2-ethyl hexanal acetal group, or a mix of butyraldehyde acetal and 2-ethyl hexanal acetal groups (see, for example, U.S. Pat. No. 5,137,954, the entire disclosure of which is incorporated herein by reference).

In various embodiments, where the interlayer is a multilayer interlayer such as a trilayer, the residual hydroxyl contents of the poly(vinyl butyral) resins used in the skin layer(s) and core layer(s) may be different, if desired, to provide certain performance characteristics. The resin for the core layer(s), for example, can comprise about 8 to about 18 wt. %, about 9 to about 16 wt. %, or about 9 to about 14 wt. % residual hydroxyl groups calculated as PVOH. The resin for the skin layer(s), for example, can comprise about 13 to about 35 wt. %, about 13 to about 30 wt. %, or about 15 to about 22 wt. %, or for certain embodiments, about 17.25 to about 22.25 wt. % residual hydroxyl groups calculated as PVOH. In some embodiments, the resins used in the skin and core layers may be reversed (that is, the core layer may comprise the higher level of residual hydroxyl groups). The resin for the core layer(s) or for the skin layer(s) or for both the skin layer(s) and core layer(s) can also comprise less than 20 wt. % residual ester groups, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, such as butyraldehyde acetal, but optionally being other acetal groups, such as a 2-ethyl hexanal acetal group, or a mix of butyraldehyde acetal and 2-ethyl hexanal acetal groups.

For a given type of plasticizer, the compatibility of the plasticizer in the polymer is largely determined by the hydroxyl content of the polymer. Polymers with greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

The PVB resin (or resins) of the present disclosure typically has a molecular weight of greater than or equal to 50,000, or about 50,000 to about 500,000, or about 70,000 to about 500,000 Daltons, or about 80,000 to about 250,000 Daltons, as measured by size exclusion chromatography using low angle laser light scattering. As used herein, the term "molecular weight" means the weight average molecular weight.

Various adhesion control agents ("ACAs") can be used in the interlayers of the present disclosure. ACAs in the interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728, 472 (the entire disclosure of which is incorporated herein by reference), residual sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

In various embodiments of interlayers of the present disclosure, the interlayer will comprise about 15 to about 100 phr (parts per hundred parts resin) total plasticizer. While the total plasticizer content is indicated above, if the interlayer is a multilayer interlayer, the plasticizer content in the skin layer(s) or core layer(s) can be different from the total plasticizer content. In addition, the skin layer(s) and core layer(s) can have different plasticizer types and plasticizer contents, as each respective layer's plasticizer content at the equilibrium state are determined by their respective residual hydroxyl contents, as disclosed in U.S. Pat. No. 7,510,771 (the entire disclosure of which is incorporated herein by reference). For example, at equilibrium the interlayer could comprise two skin layers, each with 38 phr plasticizer, and a core layer with 75 phr plasticizer, for a total plasticizer amount for the interlayer of about 54.3 phr when the combined skin layer thickness equals that of the core layer. As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

In some embodiments, the plasticizer has a hydrocarbon segment of fewer than 20, fewer than 15, fewer than 12, or fewer than 10 carbon atoms. Suitable plasticizers for use in these interlayers include esters of a polybasic acid or a polyhydric alcohol, among others. Suitable plasticizers include, for example, triethylene glycol di-(2-ethylhexanoate) ("3GEH"), tetraethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, and mixtures thereof. In some embodiments, a particularly useful plasticizer is 3GEH.

Other plasticizers may also be used as desired. Increasing the refractive index of one or more of the layers, such as a soft or core layer, to be closer to the refractive index of the other layer(s) can minimize the difference in refractive index between the layers (such as the stiff (or skin) and soft (or core) layers), thereby minimizing the amount of mottle in the multilayer interlayer. One way to increase the refractive index of one of the layers is to use a high refractive index plasticizer. As used herein, a "high refractive index plasticizer" is a plasticizer having a refractive index of at least about 1.460. The refractive index of one conventional and commonly used plasticizer, such as 3GEH, is about 1.442. The refractive indices of the conventional plasticizers listed above are from about 1.442 to about 1.449. Examples of plasticizers having a high refractive index that may be used include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates (RI of about 1.480 to about 1.550); and other specialty plasticizers (RI of about 1.490 to about 1.520). The refractive index of poly(vinyl butyral) resin is approximately 1.485 to 1.495.

Examples of the high refractive index plasticizer include, but are not limited to, esters of a polybasic acid or a polyhydric alcohol, polyadipates, epoxides, phthalates, terephthalates, benzoates, toluates, mellitates and other specialty plasticizers, among others. Examples of suitable plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. In some embodiments, examples of high refractive index plasticizers are dipropylene glycol dibenzoate, 2,2,4-trimethyl-1,3-pentanediol dibenzoate, and tripropylene glycol dibenzoate. In some embodiments, the composition includes a high refractive index plasticizer. In some embodiments, the composition includes a blend of high refractive index plasticizers or a blend of a high refractive index plasticizer and a conventional plasticizer (that does not have a high refractive index).

Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the interlayer to the elastic state. In general, higher amounts of plasticizer loading will result in lower $T_g$. Conventional interlayers generally have a $T_g$ in the range of about −5° C. to 0° C. for acoustic (noise reducing) interlayer to about 45° C. for hurricane and aircraft interlayer applications. A particularly useful $T_g$ for certain embodiments is in the range of about 25° C. to about 45° C., or for other embodiments, a particularly useful $T_g$ for certain embodiments of multilayer interlayers is in the range of about 25° C. to about 45° C. for skin and about −2° C. to about 10° C. for the core layer(s).

An interlayer's glass transition temperature is also correlated with the stiffness of the interlayer, and in general, the higher the glass transition temperature, the stiffer the interlayer. Generally, an interlayer with a glass transition temperature of 30° C. or higher increases windshield strength. A soft interlayer (generally characterized by an interlayer with a glass transition temperature of lower than 30° C.), on the other hand, contributes to the sound dampening effect (i.e., the acoustic characteristics). The interlayers of the present disclosure have glass transition temperatures of about 25° C.

to about 45° C., or in some embodiments about 25° C. to about 45° C. for skin and about −2° C. to about 10° C. for the core layer(s).

Additionally, it is contemplated that polymer interlayer sheets as described herein may be produced by any suitable process known to one of ordinary skill in the art of producing polymer interlayer sheets that are capable of being used in a multiple layer panel (such as a glass laminate or a photovoltaic module or solar panel). For example, it is contemplated that the polymer interlayer sheets may be formed through solution casting, compression molding, injection molding, melt extrusion, melt blowing or any other procedures for the production and manufacturing of a polymer interlayer sheet known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art. While all methods for the production of polymer interlayer sheets known to one of ordinary skill in the art are contemplated as possible methods for producing the polymer interlayer sheets described herein, this application will focus on polymer interlayer sheets produced through the extrusion and co-extrusion processes. The final multiple layer glass panel laminate and photovoltaic module of the present invention are formed using processes known in the art.

Generally, in its most basic sense, extrusion is a process used to create objects of a fixed cross-sectional profile. This is accomplished by pushing or drawing a material through a die of the desired cross-section for the end product.

Generally, in the extrusion process, thermoplastic resin and plasticizers, including any of those resins, plasticizers and other additives described above, are pre-mixed and fed into an extruder device. Additives such as colorants and UV inhibitors (in liquid, powder, or pellet form) are often used and can be mixed into the thermoplastic resin or plasticizer prior to arriving in the extruder device. These additives are incorporated into the thermoplastic polymer resin, and by extension the resultant polymer interlayer sheet, to enhance certain properties of the polymer interlayer sheet and its performance in the final multiple layer glass panel product (or photovoltaic module).

In the extruder device, the particles of the thermoplastic raw material and plasticizers, and any other additives described above, are further mixed and melted, resulting in a melt that is generally uniform in temperature and composition. Once the melt reaches the end of the extruder device, the melt is propelled into the extruder die. The extruder die is the component of the thermoplastic extrusion process which gives the final polymer interlayer sheet product its profile. Generally, the die is designed such that the melt evenly flows from a cylindrical profile coming out of the die and into the product's end profile shape. A plurality of shapes can be imparted to the end polymer interlayer sheet by the die so long as a continuous profile is present.

Notably, for the purposes of this application, the polymer interlayer at the state after the extrusion die forms the melt into a continuous profile will be referred to as a "polymer melt sheet." At this stage in the process, the extrusion die has imparted a particular profile shape to the thermoplastic resin, thus creating the polymer melt sheet. The polymer melt sheet is highly viscous throughout and in a generally molten state. In the polymer melt sheet, the melt has not yet been cooled to a temperature at which the sheet generally completely "sets." Thus, after the polymer melt sheet leaves the extrusion die, generally the next step in presently employed thermoplastic extrusion processes is to cool the polymer melt sheet with a cooling device. Cooling devices utilized in the previously employed processes include, but are not limited to, spray jets, fans, cooling baths, and cooling rollers. The cooling step functions to set the polymer melt sheet into a polymer interlayer sheet of a generally uniform non-molten cooled temperature. In contrast to the polymer melt sheet, this polymer interlayer sheet is not in a molten state and is not highly viscous. Rather, it is the set final-form cooled polymer interlayer sheet product. For the purposes of this application, this set and cooled polymer interlayer will be referred to as the "polymer interlayer sheet."

In some embodiments of the extrusion process, a co-extrusion process may be utilized. Co-extrusion is a process by which multiple layers of polymer material are extruded simultaneously. Generally, this type of extrusion utilizes two or more extruders to melt and deliver a steady volume throughput of different thermoplastic melts of different viscosities or other properties through a co-extrusion die into the desired final form. The thickness of the multiple polymer layers leaving the extrusion die in the co-extrusion process can generally be controlled by adjustment of the relative speeds of the melt through the extrusion die and by the sizes of the individual extruders processing each molten thermoplastic resin material.

Generally, the thickness, or gauge, of the polymer interlayer sheet will be in a range from about 15 to 100 mils (about 0.38 to 2.54 mm), about 15 mils to 60 mils (about 0.38 to about 1.58 mm), about 20 mils to about 50 mils (about 0.26 mm to about 1.45 mm), and about 15 mils to about 30 mils (about 0.38 mm to about 0.76 mm) (with the skin and core layers of the multilayered interlayer having thicknesses of about 2 mils to about 28 mils).

As noted above, the interlayers of the present disclosure may be used as a single-layer sheet or a multilayered sheet. In various embodiments, the interlayers of the present disclosure (either as a single-layer sheet or as a multilayered sheet) can be incorporated into a multiple layer panel.

As used herein, a multiple layer panel can comprise a single substrate, such as glass, acrylic, or polycarbonate with a polymer interlayer sheet disposed thereon, and most commonly, with a polymer film further disposed over the polymer interlayer. The combination of polymer interlayer sheet and polymer film is commonly referred to in the art as a bilayer. A typical multiple layer panel with a bilayer construct is: (glass)/(polymer interlayer sheet)/(polymer film), where the polymer interlayer sheet can comprise multiple interlayers, as noted above, and wherein at least one of the interlayers comprises stabilized fluorescent particles. The polymer film supplies a smooth, thin, rigid substrate that affords better optical character than that usually obtained with a polymer interlayer sheet alone and functions as a performance enhancing layer. Polymer films differ from polymer interlayer sheets, as used herein, in that polymer films do not themselves provide the necessary penetration resistance and glass retention properties, but rather provide performance improvements, such as infrared absorption characteristics. Poly(ethylene terephthalate) ("PET") is the most commonly used polymer film.

Further, the multiple layer panel can be what is commonly known in the art as a solar panel, with the panel further comprising a photovoltaic cell, as that term is understood by one of ordinary skill in the art, encapsulated by the polymer interlayer(s). In such instances, the interlayer is often laminated over the photovoltaic cell, with a construct such as:

(glass)/(polymer interlayer)/(photovoltaic cell)/(polymer interlayer)/(glass or polymer film).

The interlayers of the present disclosure will most commonly be utilized in multiple layer panels comprising two substrates, preferably a pair of glass sheets (or other rigid materials, such as polycarbonate or acrylic, known in the art), with the interlayers disposed between the two substrates. An example of such a construct would be: (glass)/(polymer interlayer sheet)/(glass), where the polymer interlayer sheet can comprise multilayered interlayers, as noted above. These examples of multiple layer panels are in no way meant to be limiting, as one of ordinary skill in the art would readily recognize that numerous constructs other than those described above could be made with the interlayers of the present disclosure.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 70° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2-5) known in the art and that are commercially practiced include vacuum bag and vacuum ring processes in which a vacuum is utilized to remove the air.

One parameter used to describe the polymer interlayers disclosed herein is the clarity, which is determined by measuring the haze value or percent haze (% Haze). Light that is scattered upon passing through a film or sheet of a material can produce a hazy or smoky field when objects are viewed through the material. Thus, the haze value is a quantification of the scattered light by a sample in contrast to the incident light. The test for percent haze is performed with a hazemeter, such as Model D25 available from Hunter Associates (Reston, Va.), and in accordance with ATSM D1003-61 (Re-approved 1977)-Procedure A using Illuminant C, at an observer angle of 2 degrees. The interlayers of the present disclosure have a percent haze of less than about 5%, about 3%, about 2%, about 1%, less than about 1%, and less than about 0.5%. The interlayers of the present disclosure also have a minimum transmission level (% T) of at least 70% (as measured on the HunterLab UltraScan XE) for clear (non-colored) interlayers. For colored or mass pigmented interlayers, the % T may be higher, as desired.

Yellowness Index ("YI") of a polymer sheet was measured by laminating (and autoclaving) a 30 gauge sheet sample between two pieces of 2.3 mm clear glass using the HunterLab UltraScan XE according to ASTM Method D1925 (illuminant C, 2° observer) from spectrophotometric light transmittance in the visible spectrum. In various embodiments of the present invention, a polymer sheet can have a yellowness index of 12 or less.

Fluorescence was measured using an Ocean Optics 365 nm LED source. Intensity was measured in counts at about 365 nm and about 490 nm using SpectraSuite software to collect the data.

Pummel adhesion is another parameter used to describe the polymer interlayers disclosed herein. The Pummel Adhesion Test is widely used throughout the world and has been a standard Solutia procedure for over 30 years. It measures the adhesion level of glass to the interlayer in a laminate construction. The interlayer to glass adhesion has a large effect on the impact resistance and long term stability of glass-interlayer structures. In this test, the laminates are cooled to 0° F. (−18° C.) and manually pummeled with a 1 lb. (0.45 kg) hammer on a steel plate at a 45 degree angle. The samples are then allowed to come to room temperature and all broken glass unadhered to the interlayer is then removed. The amount of glass left adhered to the interlayer is visually compared with a set of standards. The standards correspond to a scale in which varying degrees of glass remained adhered to the interlayer. For example, at a pummel standard of zero, essentially no glass is left adhered to the interlayer. On the other hand, at a pummel standard of ten, essentially 100% of the glass remains adhered to the interlayer. Pummel values are grouped and averaged for like specimens. Reported values state the average pummel value for the group and the maximum range of the pummel adhesion rating for individual surfaces. The interlayers of the present disclosure have a pummel adhesion rating of 2 or greater, or 8 or less, or from about 2 to about 8.

The invention also includes the following Embodiments 1 to 13, set forth below.

Embodiment 1 is a polymer interlayer for glazing comprises poly(vinyl butyral), a plasticizer, a luminescent pigment, and a carboxylic acid additive having a $pK_a$ of less than about 10, wherein the polymer interlayer has a YI of less than 12, and wherein the polymer interlayer fluoresces at a wavelength of about 400 to 700 nm.

Embodiment 2 is a polymer interlayer for glazing comprises poly(vinyl butyral), a plasticizer, from about 0.1 to about 1 phr of a luminescent pigment, and a carboxylic acid additive having a $pK_a$ of less than about 10, wherein the polymer interlayer has a YI of less than 12, and wherein the polymer interlayer fluoresces at a wavelength of about 400 to 700 nm.

Embodiment 3 is a polymer interlayer that includes the features of any of Embodiments 1 or 2, wherein the carboxylic acid additive has a structural formula: R—CO$_2$H, where R is hydrogen, an alkyl group or an aryl group.

Embodiment 4 is a polymer interlayer that includes the features of any of Embodiments 1 to 3, wherein the luminescent pigment is a pigment having the structural formula: R—OOC—Ar(OH)$_x$—COO—R, wherein each R is independently a substituent group having at least 1 carbon atom and may be the same or different, Ar is an aryl group, and x is from about 1 to 4.

Embodiment 5 is a polymer interlayer that includes the features of any of Embodiments 1 to 4, wherein the luminescent pigment has a structural formula:

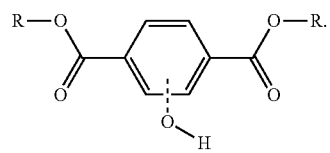

wherein each R is an ethyl group.

Embodiment 6 is a polymer interlayer that includes the features of any of Embodiments 1 to 5, wherein the luminescent pigment comprises diethyl 2,5-dihydroxyterephthalate ("DDTP") having a structural formula:

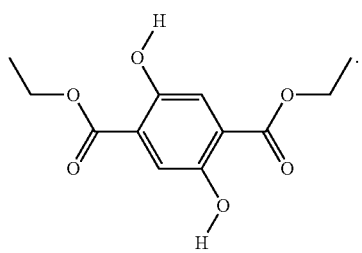 [SMILES: CCOC(=O)c1cc(O)c(C(=O)OCC)cc1O]

Embodiment 7 is a polymer interlayer that includes the features of any of Embodiments 1 to 6, wherein the carboxylic acid additive has a pKa of from about 3 to about 8.

Embodiment 8 is a polymer interlayer that includes the features of any of Embodiments 1 to 7, wherein the carboxylic acid additive is 2-ethylhexanoic acid.

Embodiment 9 is a polymer interlayer that includes the features of any of Embodiments 1 to 8, wherein the carboxylic acid additive is present in an amount of at least about 5 wt. % of the luminescent pigment.

Embodiment 10 is a polymer interlayer for glazing comprises poly(vinyl butyral), a plasticizer, from about 0.1 to about 1 phr of a luminescent pigment, wherein the luminescent pigment is a pigment having the structural formula: R—OOC—Ar(OH)$_x$—COO—R, wherein each R is independently a substituent group having at least 1 carbon atom and may be the same or different, Ar is an aryl group, and x is from about 1 to 4, and a carboxylic acid additive having a $pK_a$ of less than about 10, wherein the polymer interlayer has a YI of less than 12, and wherein the polymer interlayer fluoresces at a wavelength of about 400 to 700 nm.

Embodiment 11 is a polymer interlayer that includes the features of any of Embodiments 1 to 10, wherein the polymer interlayer has a YI that is less than a polymer interlayer having the same composition without the carboxylic acid additive having a $pK_a$ of less than about 10.

Embodiment 12 is a polymer interlayer that includes the features of any of Embodiments 1 to 11, wherein the plasticizer comprises at least one high refractive index plasticizer having a refractive index of at least about 1.460.

Embodiment 13 is a polymer interlayer that includes the features of any of Embodiments 1 to 12, wherein the polymer interlayer is laminated between two rigid substrates to form a window or windshield.

EXAMPLES

The improvements (or reduction) in the yellowness index (YI) or color in an interlayer and the change in YI and haze over time can be most readily appreciated by a comparison of an interlayer comprising a carboxylic acid in combination with a luminescent pigment compared to an interlayer without the addition of the carboxylic acid. Samples were produced to determine whether the addition of an acid additive reduced the YI, and then to determine the optimum amount of the various additives in the compositions.

The compositions shown in Table 1 were produced by mixing and melt-extruding PVB resin and a plasticizer mixture having about 38 phr plasticizer. The plasticizer mixture was made by mixing the following components: Diethyl 2,5-dihydroxyterephthalate (DDTP), Additive (as indicated in the Tables) and triethylene glycol di-(2-ethylhexanoate) ("3GEH" plasticizer) along with other common additives (including adhesion control agents and a UV stabilizer) using an overhead mixer for thirty minutes at 50° C. using a high shear mixing blade to form a solution. The solution formed was mixed with poly(vinyl butyral) resin using a stand mixer. The resulting mixture of resin, plasticizer, pigment (as indicated in Tables) and additives (as indicated in Tables) was then extruded on a 1.25 inch extruder to form an interlayer sheet having a thickness of about 0.76 mm (30 gauge (30 mils)). The samples in Table 1 are control samples to test the luminescent pigment in a standard formulation with UV absorber, as well as pigment and an additive in Samples C5, C6 and C7, and a fixed amount of luminescent pigment (DDTP) as shown in Table 1 below. The amount of UV absorber was varied. YI and % Haze were measured on the samples. Samples C1 and C2 are control samples with different amounts of UV absorber, with no DDTP or additive.

TABLE 1

| Sample | Additive | Luminescent Pigment | UV Absorber | YI | % Haze | Fluorescence (Counts at 490 nm) |
|---|---|---|---|---|---|---|
| C1 | None | None | 0.25 phr | −0.05 | 0.20 | — |
| C2 | None | None | 0.5 phr | −0.03 | 0.10 | — |
| C3 | None | 0.6 phr | 0.25 phr | 15.84 | 1.60 | 2970 |
| C4 | None | 0.6 phr | 0.5 phr | 15.65 | 1.50 | 2930 |
| C5 | 2-EHA - 0.3 phr | 0.6 phr | 0.25 phr | 8.32 | 0.80 | 3079 |
| C6 | 2-EHA - 0.3 phr | 0.6 phr | 0.5 phr | 8.31 | 0.80 | 3040 |
| C7 | Antioxidant* - 0.5 phr | 0.6 phr | 0.25 phr | 15.83 | 1.10 | 2940 |

*Lowinox ® 44B25 antioxidant - an antioxidant based on a sterically hindered alkylated bis-phenol The YI and % Haze measurements in Table 1 show that the addition of an acid additive, such as 2-ethylhexanoic acid ("2-EHA"), significantly reduces the YI compared to samples without the acid additive. Specifically, Samples C3 and C4 show that with the addition of DDTP to the formulation, the YI and % Haze both increased significantly compared to the control samples, C1 and C2, and when an acid additive, such as 2-ethylhexanoic acid ("2-EHA") is added (as in Samples C5 and C6) to the formulations of C3 and C4, both the YI and % Haze are significantly reduced in C5 and C6 compared to the YI and % Haze of C3 and C4, without the 2-EHA. As shown by Sample C7, the addition of a non-acid additive, a common antioxidant, Lowinox® 44B25 antioxidant, does not reduce the YI or % Haze significantly. Table 1 also shows that the addition of the acid additive has no significant adverse effect on the Fluorescence or the % Haze of the sample, as shown by the % Haze results and the fluorescence counts. When 2-EHA is added to the composition (Samples C5 and C6), the % Haze is actually reduced compared to the samples without the additive.

Once it was determined that the addition of an acid additive helped to control the color or reduce the YI (or to prevent YI from increasing dramatically) when a luminescent pigment was added to the composition, samples were produced to determine the effect of different amounts and the optimum concentration of luminescent pigment to be used to provide the desired level of fluorescence. The samples in Table 2 are samples to test the effect of the luminescent pigment by varying amounts of the luminescent pigment in a standard formulation with the addition of 0.3 phr of an acid additive, 2-EHA, and other common additives (such as adhesion control agents) as shown in Table 2 below. The samples were produced using the same procedure and components as described in Table 1, with the addition of 2-EHA and variation of the luminescent pigment as indicated in Table 2. The amount of luminescent pigment was varied from 0.0005 phr to 0.6 phr. YI and % Haze were measured on the samples. Results are shown in Table 2 below.

TABLE 2

| Sample | Luminescent Pigment | YI | % Haze |
|---|---|---|---|
| C8 | 0.0005 phr | −0.28 | 0.13 |
| C9 | 0.005 phr | −0.28 | 0.19 |
| C10 | 0.01 phr | −0.23 | 0.20 |
| C11 | 0.1 phr | 1.4 | 0.58 |
| C12 | 0.2 phr | 3.4 | 0.70 |
| C13 | 0.4 phr | 6.03 | 0.80 |
| C14 | 0.6 phr | 8.09 | 0.92 |

Figure 2:
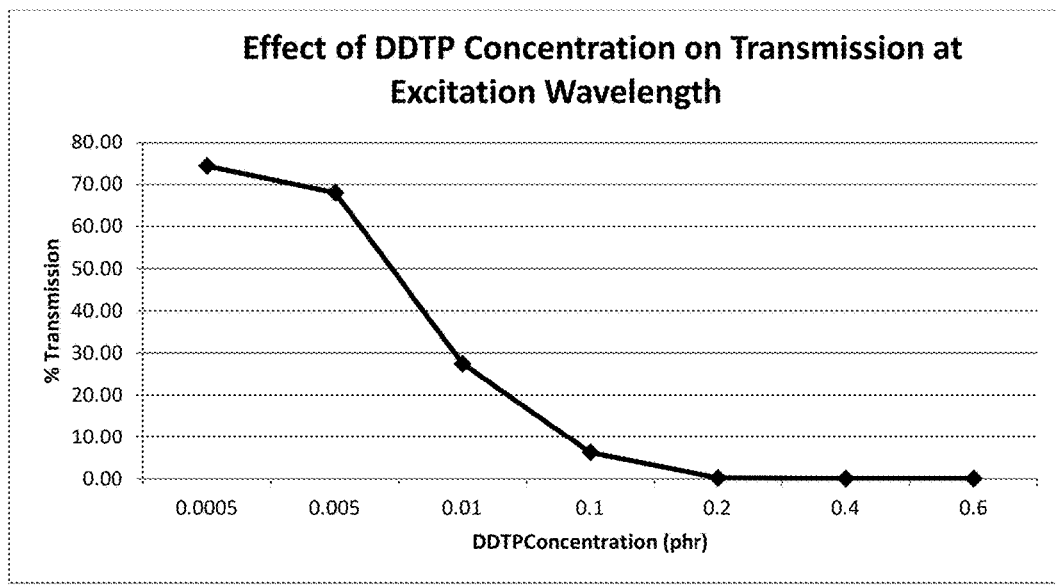
FIG. 2 is a graph showing the effect of fluorescent pigment concentration on transmission at excitation wavelength.

Table 2 shows that as the amount of luminescent pigment in the composition increases, both the YI and % Haze increase. Fluorescence was also measured on Samples C8 to C14, and the results are shown in FIGS. 1 and 2. As shown in FIGS. 1 and 2, the amount of luminescent pigment has little or no effect on the fluorescence once the amount of pigment is at least 0.1 phr. As shown in FIG. 1, when the amount of luminescent pigment is between 0.2 and 0.6 phr, there is no significant loss in intensity at 490 nm with 0.2 phr vs. 0.6 phr, and as shown in FIG. 2, there is no significant difference in the transmission at excitation wavelength between 0.2 phr and 0.6 phr.

The improvements (or reduction) in the yellowness index (YI) or color in an interlayer can be most readily appreciated by a comparison of an interlayer comprising a carboxylic acid in combination with a luminescent pigment compared to an interlayer without the addition of the carboxylic acid. For the examples in Table 3, the following components and amounts were used: Diethyl 2,5-dihydroxyterephthalate (DDTP, 0.6 phr); Additive (type as indicated in Table 3, 0.3 phr) and triethylene glycol di-(2-ethylhexanoate) ("3GEH" plasticizer, 38 phr); other common additives (including adhesion control agents and a UV stabilizer); and poly(vinyl butyral) resin (750 grams). The resulting mixture was then extruded on a 1.25 inch extruder to form an interlayer sheet having a thickness of about 0.76 mm (30 gauge (30 mils)). The interlayer sheet was then laminated between two pieces of clear glass (2.3 mm thick each) and evaluated for YI and % Haze using a HunterLab UltraScan XE instrument, and for Pummel Adhesion level.

Samples 1 to 9 compare the effect of different carboxylic acid additives (Samples 3 to 6) having different $pK_a$ values as well as common antioxidants (Samples 7 to 9) on the color (YI) and haze of formulations with the luminescent pigment. The samples were produced as described above, and the compositions and additive, as well as the $pK_a$ value(s) of the additive, are listed in Table 3. Control examples were also made and evaluated to test the same interlayer formulation without either the luminescent pigment or the acid additive (Sample 1), and with the luminescent pigment but no acid additive (Sample 2), to compare against the samples with the various acid additives and common antioxidants. Results are shown in Table 3 below.

TABLE 3

| Sample No. | Composition/Additive | $pK_a$ of additive | YI | % Haze | Pummel Adhesion (Ave.) |
|---|---|---|---|---|---|
| 1 | No DDTP, no additive | N/A | −0.21 | 0.27 | 2 |
| 2 | DDTP, no additive | N/A | 13.40 | 0.98 | 2 |

TABLE 3-continued

| Sample No. | Composition/Additive | $pK_a$ of additive | YI | % Haze | Pummel Adhesion (Ave.) |
|---|---|---|---|---|---|
| 3 | DDTP, salicylic acid | 3.0, 9.0 | 5.56 | 0.72 | 9 |
| 4 | DDTP, benzoic acid | 4.2 | 5.40 | 0.82 | 7 |
| 5 | DDTP, 2-EHA | 4.8 | 8.64 | 0.85 | 2 |
| 6 | DDTP, citric acid | 4.8, 5.4, 6.4 | 6.91 | 1.15 | 6 |
| 7 | DDTP, hydroquinone | 10.35 | 16.45 | 1.20 | 2 |
| 8 | DDTP, butylated hydroxytoluene (BHT) | 12.23 | 13.50 | 1.15 | 2 |
| 9 | DDTP, Antioxidant* | 12.0 | 15.83 | 1.10 | 2 |

*Lowinox ® 44B25 antioxidant

Table 3 shows that for the samples comprising an acid additive having a $pK_a$ in the range of from about 3 to less than about 10 provided lower YI values, and therefore lower color or less yellowness, than the samples comprising other common antioxidants as additives, such as BHT, hydroquinone or Lowinox® 44B25 (a commercially available antioxidant). Additionally, % Haze values of the samples were all about 1.2% or less, with benzoic acid and salicylic acid providing the best combination of YI and % Haze values (that is, the lowest values and therefore the least amount of color and haze). Sample 1, which had no DDTP, carboxylic acid or antioxidant had very low YI and % Haze values as expected since no luminescent pigment was present and therefore no yellowness increase. Sample 2, which had DDTP but no carboxylic acid or other additive, had low % Haze but very high color (YI greater than 13). Addition of an acid additive, and in particular a carboxylic acid additive having a certain $pK_a$, provided improved extruded compositions having acceptable % Haze and YI, as shown in Samples 3 to 6, and particularly in Samples 3 to 5, where % Haze is less than 1.0%. Additionally, as shown by the Pummel Adhesion values, carboxylic acid additives other than 2-ethylhexanoic acid significantly increase the adhesion level.

Figure 3:
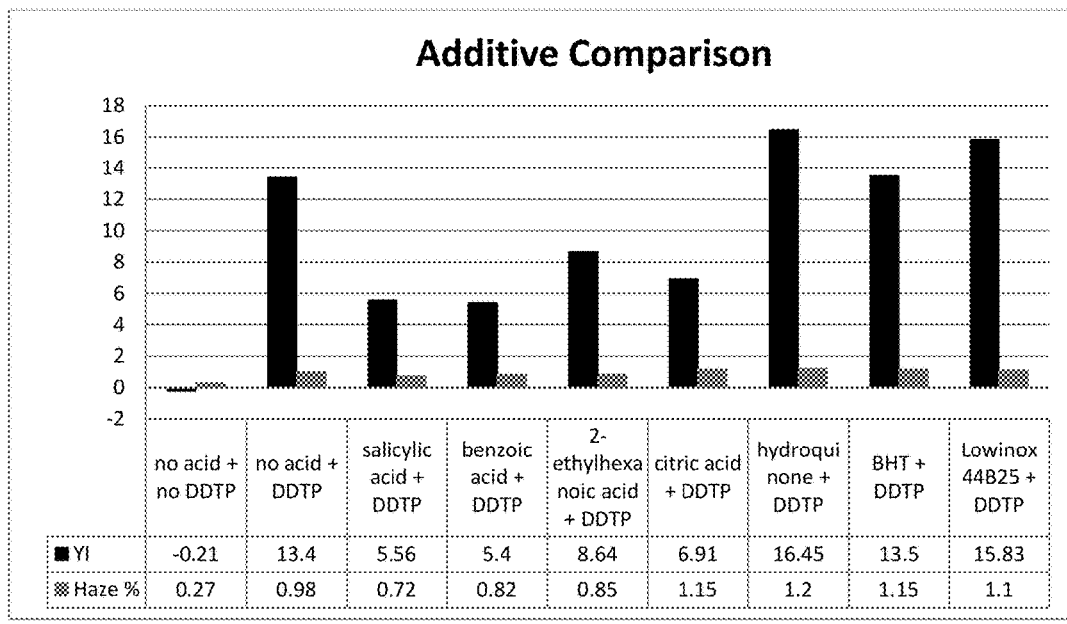
FIG. 3 provides a bar chart showing a comparison of YI and % Haze for formulations with different additives.

FIG. 3 is a bar chart showing a comparison of YI and % Haze for the compositions in Table 3. FIG. 3 shows that while YI and % Haze are very low in the control sample with no luminescent pigment or carboxylic acid additive (Sample 1), they are noticeably higher for the control with luminescent pigment but no carboxylic acid additive (Sample 2). FIG. 3 also shows the effectiveness of a range of different carboxylic acid additives as well as known antioxidants (as listed in Table 3) relative to the controls samples. As shown by the data in Table 3 and in FIG. 3, all of the carboxylic acid additives reduced the YI and % Haze, and benzoic acid and salicylic acid, when used as the carboxylic acid additive, were the most effective at reducing YI while maintaining a low % Haze in the interlayer comprising the luminescent or fluorescent pigment.

Additional samples were tested to determine the effect of varying the level of acid additive on fluorescence and to determine the optimum amount of acid additive. Samples were made as previously described, with various levels of acid additive as listed in Table 4, and 0.6 phr DDTP in all samples except for Sample 10 (which was a control sample). % Haze and YI were measured as previously described, and the results are shown in Table 4 below and in FIG. 4.

TABLE 4

| Sample No. | Acid Additive | Amount of Acid Additive (phr) | YI | Haze (%) | Fluorescence at 490 nm (Counts) |
|---|---|---|---|---|---|
| 10 | None (No DDTP) | 0 | 0.31 | 0.32 | 219.89 |
| 11 | None | 0 | 13.49 | 1.08 | 1437.65 |
| 12 | Benzoic acid | 0.3 | 5.40 | 0.82 | 1470.54 |
| 13 | Benzoic acid | 0.2 | 5.77 | 0.73 | 1470.00 |
| 14 | Benzoic acid | 0.1 | 6.51 | 0.73 | 1477.28 |
| 15 | Benzoic acid | 0.05 | 7.75 | 1.05 | 1471.51 |
| 16 | Salicylic acid | 0.3 | 5.56 | 0.72 | 1465.87 |
| 17 | Salicylic acid | 0.2 | 5.44 | 0.80 | 1479.61 |
| 18 | Salicylic acid | 0.1 | 6.20 | 0.87 | 1485.09 |
| 19 | Salicylic acid | 0.05 | 8.88 | 0.92 | 1504.59 |
| 20 | 2-EHA | 0.3 | 8.64 | 0.85 | 1473.36 |
| 21 | 2-EHA | 0.2 | 8.73 | 0.93 | 1490.57 |
| 22 | 2-EHA | 0.1 | 9.77 | 0.88 | 1491.23 |
| 23 | 2-EHA | 0.05 | 10.95 | 1.07 | 1483.67 |

Figure 4:
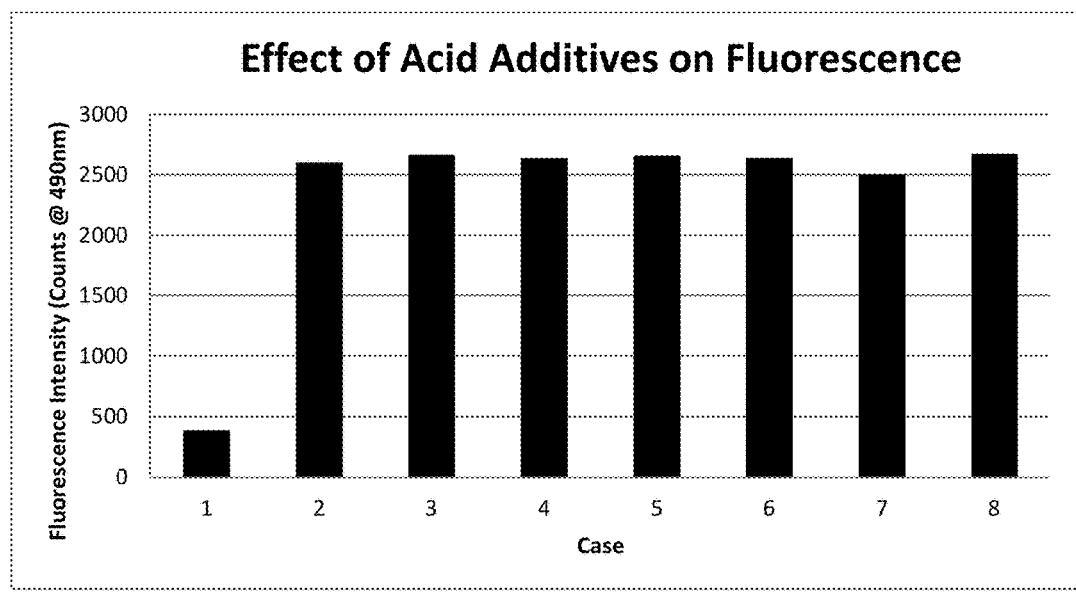
FIG. 4 is a graph showing the effect of different additives on fluorescence.

The level of carboxylic acid additive varied from 0.05 to 0.3 phr for each of the three different carboxylic acid additives tested. Table 4 shows that varying the level or type of carboxylic acid additive does not significantly affect the fluorescence. FIG. 4 shows the effect of the acid additives on the fluorescence of the composition. As shown by both Table 4 and FIG. 4, none of the acid additives negatively impact (or reduce) the level of fluorescence.

In conclusion, the interlayers having a fluorescent pigment and comprising a carboxylic acid additive as described herein have advantages over interlayers having fluorescent pigments without the carboxylic acid additive. In general, use of a carboxylic acid additive having a certain $pK_a$ value results in decreased levels of YI and haze and therefore improved optical quality interlayers with fluorescent pigments. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizers in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

The invention claimed is:

1. An extruded polymer interlayer for glazing, comprising a composition comprising:
   poly(vinyl butyral),
   a plasticizer,
   a luminescent pigment having the structural formula: R—OOC—Ar(OH)$_x$—COO—R, wherein each R is independently a substituent group having at least 1 carbon atom and may be the same or different, Ar is an aryl group, and x is from about 1 to 4, and
   a carboxylic acid additive having a $pK_a$ of less than about 10, wherein the carboxylic acid additive is present in amount of from about 10 to about 200 wt. % of the amount of luminescent pigment,
   wherein the composition is mixed and melt extruded to form the polymer interlayer,
   wherein the polymer interlayer has a YI of less than 12, and
   wherein the polymer interlayer fluoresces at a wavelength of about 400 to 700 nm.

2. The polymer interlayer of claim 1, wherein the carboxylic acid additive has a structural formula: R—CO$_2$H, where R is hydrogen, an alkyl group or an aryl group.

3. The polymer interlayer of claim 1, wherein the luminescent pigment has a structural formula:

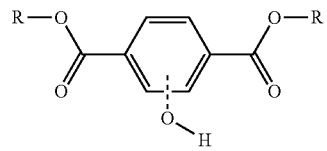

wherein each R is an ethyl group.

4. The polymer interlayer of claim 1, wherein the luminescent pigment comprises diethyl 2,5-dihydroxyterephthalate ("DDTP") having a structural formula:

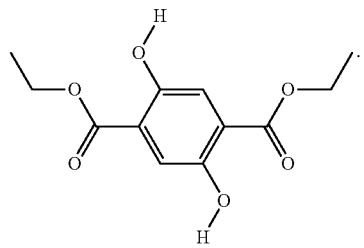 [SMILES: CCOC(=O)c1cc(O)c(C(=O)OCC)cc1O]

5. The polymer interlayer of claim 1, wherein the carboxylic acid additive has a pKa of from about 3 to about 8.

6. The polymer interlayer of claim 1, wherein the carboxylic acid additive is 2-ethylhexanoic acid.

7. The polymer interlayer of claim 1, wherein the polymer interlayer has a YI that is less than a polymer interlayer having the same composition without the carboxylic acid additive having a $pK_a$ of less than about 10.

8. The polymer interlayer of claim 1, wherein the plasticizer comprises at least one high refractive index plasticizer having a refractive index of at least about 1.460.

9. An extruded multilayer polymer interlayer for glazing, comprising:
   a first polymer layer comprising a composition comprising a poly(vinyl butyral),
   a plasticizer,
   from about 0.1 to about 1 phr of a luminescent pigment having the structural formula: R—OOC—Ar(OH)$_x$—COO—R, wherein each R is independently a substituent group having at least 1 carbon atom and may be the same or different, Ar is an aryl group, and x is from about 1 to 4, and a carboxylic acid additive having a $pK_a$ of less than about 10, wherein the carboxylic acid additive is present in amount of from about 10 to about 200 wt. % of the amount of luminescent pigment, wherein the composition is mixed and melt extruded to form the first polymer layer, and a second polymer layer, wherein the polymer interlayer has a YI of less than 12, and wherein the polymer interlayer fluoresces at a wavelength of about 400 to 700 nm.

10. The multilayer polymer interlayer of claim 9, wherein the carboxylic acid additive is present in an amount of at least about 5 wt. % of the luminescent pigment.

11. The multilayer polymer interlayer of claim 9, wherein the polymer interlayer has a YI that is less than a polymer interlayer having the same composition without the carboxylic acid additive having a $pK_a$ of less than about 10.

12. The multilayer polymer interlayer of claim 9, wherein the carboxylic acid additive has a structural formula: R—$CO_2$H, where R is hydrogen, an alkyl group or an aryl group.

13. The multilayer polymer interlayer of claim 9, wherein the luminescent pigment has a structural formula:

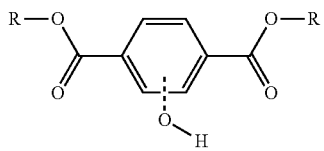

wherein each R is an ethyl group.

14. The multilayer polymer interlayer of claim 9, wherein the luminescent pigment comprises diethyl 2,5-dihydroxyterephthalate ("DDTP") having a structural formula:

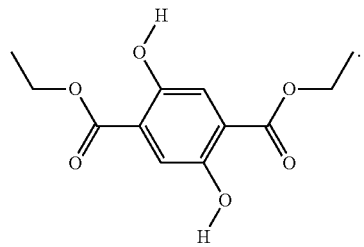 [SMILES: CCOC(=O)c1cc(O)c(C(=O)OCC)cc1O]

15. The multilayer polymer interlayer of claim 9, wherein the carboxylic acid additive has a $pK_a$ of from about 3 to about 8.

16. The multilayer polymer interlayer of claim 9, wherein the plasticizer comprises at least one high refractive index plasticizer having a refractive index of at least about 1.460.

17. An extruded polymer interlayer for glazing, comprising a composition comprising:

poly(vinyl butyral), a plasticizer, from about 0.1 to about 1 phr of a luminescent pigment, wherein the luminescent pigment is a pigment having the structural formula: R—OOC—Ar(OH)$_x$—COO—R, wherein each R is independently a substituent group having at least 1 carbon atom and may be the same or different, Ar is an aryl group, and x is from about 1 to 4, and a carboxylic acid additive having a $pK_a$ of less than about 10, wherein the carboxylic acid additive is present in amount of from about 10 to about 200 wt. % of the amount of luminescent pigment, wherein the composition is mixed and melt extruded to form the polymer interlayer, wherein the polymer interlayer has a YI of less than 12, and wherein the polymer interlayer fluoresces at a wavelength of about 400 to 700 nm.

18. The polymer interlayer of claim 17, wherein the polymer interlayer is laminated between two rigid substrates to form a window or windshield.

19. The polymer interlayer of claim 17, wherein the polymer interlayer has a YI that is less than a polymer interlayer having the same composition without the carboxylic acid additive having a $pK_a$ of less than about 10.

20. The polymer interlayer of claim 1, wherein the carboxylic acid additive is present in amount of from about 15 to about 50 wt. % of the amount of luminescent pigment.

* * * * *